(12) United States Patent
Labaton (10) Patent No.: US 7,181,621 B2
(45) Date of Patent: Feb. 20, 2007

(54) METHODS AND DEVICE FOR DIGITALLY SIGNING DATA

(75) Inventor: Isaac J. Labaton, Jerusalem (IL)

(73) Assignee: Enco-Tone Ltd., Jerusalem (IL)

( * ) Notice: Subject to any disclaimer, the term of this patent is extended or adjusted under 35 U.S.C. 154(b) by 0 days.

(21) Appl. No.: 11/159,513

(22) Filed: Jun. 22, 2005

(65) Prior Publication Data
US 2006/0005028 A1   Jan. 5, 2006

Related U.S. Application Data (63) Continuation of application No. 10/362,894, filed on Feb. 25, 2003, now Pat. No. 6,912,659.

(51) Int. Cl.
*H04L 9/00* (2006.01)
(52) U.S. Cl. .................. 713/176; 713/168; 713/181
(58) Field of Classification Search ................ 713/172, 713/175–176, 178, 180, 189, 192–194, 168, 713/181; 726/26, 30; 380/227–229, 247
See application file for complete search history.

(56) References Cited

U.S. PATENT DOCUMENTS

| | | | | |
|---|---|---|---|---|
| 5,297,206 A | * | 3/1994 | Orton | 380/30 |
| 5,422,953 A | * | 6/1995 | Fischer | 713/172 |
| 6,607,136 B1 | * | 8/2003 | Atsmon et al. | 235/492 |

* cited by examiner

*Primary Examiner*—Hosuk Song
(74) *Attorney, Agent, or Firm*—Snell & Wilmer L.L.P.

(57) ABSTRACT

Methods and device for digitally signing documents by using a portable device that encodes a signature string to sound. The acoustic signature string may be transmitted and then decoded back into digital data. The signature string may be further processed to verify the signature of the document and to produce a certificate of identity and integrity for the document. The certificate of identity and integrity may be used to further identify and validate the document and its signer.

6 Claims, 5 Drawing Sheets

METHODS AND DEVICE FOR DIGITALLY SIGNING DATA

CROSS REFERENCE TO RELATED APPLICATIONS

This application is a continuation of, and claims benefit from U.S. patent application Ser. No. 10/362,894 which was filed on Feb. 25, 2003, now U.S. Pat. No. 6,912,659 and which is hereby incorporated by reference.

TECHNICAL FIELD

The present invention relates, generally, to digital signatures of data and, more particularly, to methods and device for securely carrying out digital signatures of data in manner that can be used by non-technically skilled persons.

BACKGROUND OF THE INVENTION

There have many advances in the technology relating to the digital signature of documents. For example, standards such as the Public Key Infrastructure (PKI) have been established and widely accepted. As a result, Certification Authorities (CA) have been established and are increasing in number. Examples of public CAs are VeriSign, Thawte, and Entrust. CAs are used as a trusted third party to generate public-key certificates for an entity. Many entities use X.509 certificates, while other entities are using standards such as the public key cryptographic standard (PKCS) #7 for digitally sign soft documents.

Currently, many problems exist that inhibit the widespread acceptance of digital signatures. One problem is the lack of portability, from computer to computer, in present approaches used for digital signatures. The lack of portability often results in limiting a user of digital signatures to one specific computer.

Furthermore, there are many difficulties that arise when the recipient of a digitally signed document presents the document to a third party and attempts to establish to the third party, that the document was digitally signed by the original sender of the document. For example, the recipient may be able to verify that the received document has been signed, however, the recipient is unable to re-send the document to a third party, while keeping the original signature intact and valid.

Another problem is the lack of security in protecting private keys. Currently, digital signatures are computed using private keys. Public keys are associated with a particular entity, and are intended to be known to everyone who needs to have trusted interactions with that entity. The public keys are also used to verify signatures. Private keys must be protected from public access and are supposed to be known only to the particular entity that owns the private key. However, if private keys are not adequately protected, then they can be stolen by hackers. Hackers can steal private keys by hacking their way onto a computer and accessing the private keys that may be stored on the hard drive. Stolen private keys can be used to "forge" the digital signature of a particular entity. In addition, if the security of a private key is compromised, the signer of a specific document could deny ever signing the document, a fact that is referred to as "repudiation", on the grounds that his key might have been stolen by a hacker and used to sign the document. Thus, private keys should be protected by adequate security mechanisms. However, adequate security mechanisms such as a "firewall" are expensive to install and maintain, and are often too complex for the typical individual user of a computer. Furthermore, it is well known in the art that even the best firewalls can be penetrated, and thus, even private keys protected by a firewall can be compromised and stolen by an unscrupulous hacker. These security issues have contributed to the lack of widespread use and acceptance of digital signatures.

In order to provide adequate protection for private keys, sophisticated technologies are required that are extremely expensive and may even require a network of personal computers. Clearly, these sophisticated solutions are not and never will be popular.

Other current solutions include storing private keys in chip cards or in USB tokens. These current solutions also have several disadvantages. For example, they require the use of special equipment to read the chip cards or they require the availability and accessibility of USB slots. In addition, it is worth noting that both chip cards and USB tokens, each of which require the physical connection of the chip card or USB token to a computer, could result in repudiation claims based on the scenario where chip cards or USB tokens can be actuated or triggered without the agreement and knowledge of the owner. The request of a fixed personal identification number (PIN) in order to actuate a chip card or USB token is not an obstacle for the unscrupulous hacker who can hack onto a computer and steal a PIN that has been previously entered into the computer.

In addition, many current solutions restrain the use of digital signatures to personal computers (PCs) or similar devices, and thus do not enable the sending of a digitally signed document through other types of devices such as a telephone.

An additional problem of present solutions lies in the CA/revocation list system which hands over to the recipient (13) the obligation to check the revocation list which is a concept that is not well known to a person who is not skilled in the art. Furthermore, a recipient (13) that checks the validity of the public-key certificate typically has to keep records that show that at a particular time the public-key certificate was not revoked, and, therefore, it was proper to accept the signature as verified. This further restricts the use of the digital signatures and prevents their widespread usage.

SUMMARY OF THE INVENTION

In accordance with one embodiment of the present invention, a method is disclosed that is designed for solving the problem of the mass usage of the digital signatures for soft documents. The method utilizes a system that includes a personal handheld device used by the user or "signer" of the soft document, as well as the use of a third party or entity (referred to as "Notarial Transaction Certification Server") that may be represented by software executed on a central computer. The method starts with a soft document (referred to as the "Original File", which can be any electronic file, e.g., a complete directory), that is to be signed by a specific entity (i.e., the signer), that may reside on a computerized device such as a personal computer (PC), a personal digital assistant (PDA) such as a Palm device, or any other type of computerized device (e.g., a cellular phone) that may store soft documents. The signer or "token holder" may use a personal handheld device (referred to as a "token"), such as the as the acoustic token disclosed in U.S. Pat. No. 6,236,724 (hereinafter referred to as the '724 patent) issued on May 22, 2001 and assigned to Encotone Ltd of Jerusalem, Israel. Alternatively, a cellular phone with special software or any other handheld or portable device, such as a PDA, may be used by the signer to carry out the methods of the present invention.

In accordance with the current embodiment of the present invention, the token holder applies a specific hash function (e.g., SHA1, MD5 or the like) to the original file that is to be signed. The hash computation may be carried out on the PC where the original file is stored. The application of the hash function to the original file produces a "Result." Next, the token holder may enter the Result of the hash function into the token by means of the token's keypad or any other way such as by infrared communication, bar code scanner, optical means or the like. The Result may be stored in the token's memory. The stored Result may be referred to as "Locally Entered Data." The token may encrypt the Locally Entered Data to produce "Cipher Text." The encryption step may utilize well known encryption techniques such as RSA, DSA, or ECDSA. The token also computes a token's identification code, referred to as an "ID Code" or token's ID Code (7), that may be variable or dynamic. The ID Code and the Cipher Text may be encoded by the token, either separately or concatenated together, into sound waves or any other type of analog waves. The analog waves may be referred to as the "Acoustic Message." The Acoustic Message may be transmitted to the PC which may receive the Acoustic Message, by means of a microphone or similar device. The PC may utilize a hardware or software module, referred to as a "Decoder", that may be similar to the Decoder disclosed in the '724 patent, that records the Acoustic Message and decodes the Acoustic Message into digital digits. In this manner, the ID Code and the Cipher Text may be recovered and stored as a string of bits (referred to as a "Signature String") in a computer-file or equivalent.

Next, the two files (i.e., the Original File and the Signature String) may be sent to a Recipient by means of the Internet, e-mail, modem, Intra-net, computer diskettes, CD-ROM or the like. The Recipient receives the two files and at the same time, or at a later time, may check or verify the digital signature of the Original File. The checking or verification process may be initiated by sending the Signature String File to a third party referred to as a Notarial Transaction Certification Server (NTCS). The NTCS may be embodied as software on a server that is connected to the Recipient by the Internet, wide area network, or any other connection.

The NTCS may interpret the ID Code received within the Signature String to determine the identity or serial number of the token that produced the ID Code. The NTCS may also determine the encryption key or public key that is necessary for decrypting the received Cipher Text such that the encrypted Locally Entered Data may be verified.

When the token's identity is established by the NTCS, the NTCS can prepare a document, such as a document in accordance with the PKCS #7 standard, which includes the identity of the token's owner and the Result of the Hash function as applied to the Original File. This document may be referred to as the Certificate of Integrity and Identity.

Next, the Certificate of Integrity and Identity (16) may be sent to the PC that transmitted the Original File. The token-holder may then store the Original File and its corresponding Certificate of Integrity and Identity for their records. In addition, the token holder may send the two documents to the Recipient using a variety of known techniques such as the Internet, e-mail, diskettes, or the like.

The Recipient can apply the same Hash function used by the token holder to the Original File. The Recipient can compare this "independently computed Result" with the Result received in the Certificate of Integrity and Identity (also referred to as Notarial Transaction Certificate).

If both Results are identical, then it may be inferred that the Original File received from the token holder has not been altered or tampered with. Furthermore, the Recipient may store for their records the Certificate of Integrity and Identity, which includes the ID of the token-holder, as a record of the identity of the person that digitally signed the Original File.

In accordance with another aspect of the present invention, a time stamp may be computed and included with the token's ID Code. The time stamp includes information as to the time at which the token holder digitally signed the Original File. The time stamp may be encrypted and included with the Signature String that is sent to the Recipient. The NTCS may then recover the time stamp and include it in the Certificate of Integrity and Identity. In this manner, the time at which the token holder digitally signed the Original File may be recorded in the Certificate of Integrity and Identity.

In accordance with another aspect of the present invention, a subset or part of the Result of the hash function may be used by the token holder as the Locally entered data. Similarly, the NTCS may receive the complete result directly, and the signed matching subset of the Result that is received within the Signature String. For example, the token holder may utilize 8 consecutive digits of the Result as Locally entered data, and the NTCS may verify such Locally entered data and match it with the complete Hash function result.

In accordance with another aspect of the present invention, a software application (referred to as the Signature Computation Application) may be used to execute the steps of applying a specific Hash function to the Original-File, displaying the total or partial Result of the Hash function, transmitting the total Result to the NTCS, open a time window for enabling the token-holder to prepare and send the Acoustic Message, decoding the Acoustic Message, creating the Signature String from the Acoustic Message, and transmitting the Signature String to the NTCS.

In accordance with another aspect of the present invention, the Recipient may utilize a software application (referred to as the Signature Verification Application) for executing the steps of opening the Certificate of Integrity and Identity, applying the Hash function to the Original-File, and comparing the independently computed Result with the Result received within the Certificate of Integrity and Identity.

In accordance with another aspect of the present invention, a Phone Gate server may be utilized. The Phone Gate server may comprise a computer server that may be accessed via a standard or wireless telephone connection. Once the token-holder has entered either the full or partial Hash function Result into the token, the token holder may place a call to the Phone Gate server by using a conventional or wireless telephone. Once the connection to the Phone Gate server is established, the token holder may use the telephone's microphone to send the Acoustic Message from the token to the Phone Gate Server. The Decoder software may execute on the Phone Gate Server and decode the Acoustic Message in order to recover the Signature String. Next, the Phone Gate Server may transmit the Signature String to the NTCS which may issue the Certificate of Integrity and Identity. In addition, the NTCS may store the Certificate of Integrity and Identity and/or send this Certificate to the signer or token holder. The token holder may now possess two documents—the Original File and the corresponding Certificate of Integrity and Identity. These documents may be stored by the token holder. In addition, the token holder may transmit the Original File and its corresponding Certificate to the Recipient. The Recipient may check and verify the documents by applying the Hash Function to the Original File and thereby obtaining an independently computed Result. The Recipient may next compare the independently computed Result with the Result stored in the Notarial Transaction Certificate (i.e., the Certificate of Integrity and Identity).

In accordance with another aspect of the present invention, a token is provided that includes the token owner's private key and installed software for enabling the token owner to digitally sign a data string (i.e., the locally entered data) which is keyed-in or otherwise entered into the token's memory. The token owner will apply a hash function to the data string and enter the Result (or a part thereof) into the token. The token will digitally sign the Locally Entered data (i.e., the entered Result) using the token owner's private key and thereby compute a digital string (the "Cipher text"). The token may then encode the cipher text and the token's ID Code into sound. The encoding into sound may be triggered by pressing a button on the token. The encoded sound (i.e., the Acoustic Message) may be transmitted to a Phone Gate server, after a connection has been made to the Phone Gate server, by pressing a button on the token. The Phone Gate server may convert the received Acoustic Message into a Signature String that may be transmitted to the NTCS. The NTCS may interpret the Signature String and determine the token's identity or serial number by utilizing the token's ID Code stored in the Signature String. In addition, the NTCS may retrieve the X.509 certificate corresponding to the token owner. The X.509 may be used by the NTCS to verify the received Cipher text and thereby verify the Locally entered data stored in the Signature String. Once the Locally entered data has been verified, the token owner ID may be extracted from the X.509 certificate and the NTCS may issue the corresponding Certificate of Integrity and Identity.

In accordance with another aspect of the present invention, cellular phones may be utilized instead of tokens. The cellular phone holder may enter the Locally entered data into the cellular phone. The cellular phone may have special software installed on it that may provide functionality for storing at least one private-key for encrypting strings, for example in the SIM card of the cellular phone, and the cellular phone may compute the digital signature of the entered data string.

In accordance with further aspects of the present invention, the cellular phone's batteries can be replaced with other special batteries, which includes all or most of the acoustic token components, and its functionality, and in this way the person who carries the cellular phone also carries the acoustic token capabilities and functionality.

DETAILED DESCRIPTION

The present invention may be described herein in terms of functional block components and processing steps. It should be appreciated that such functional blocks may be realized by any number of hardware or software components configured to perform the specified functions. For example, the present invention may employ various software components, e.g., logic elements, database tables, look-up tables, and the like, which may be used to carry out a variety of functions under the control of one or more microprocessors or other control devices. In addition, those skilled in the art will appreciate that the present invention may be realized in a software or computer program context in conjunction with any number of conventional computer system environments. Furthermore, the present invention is not limited to the process flows described herein, as any process flow or rearrangement of process steps which captures the features of the present invention is considered to be within the scope of the present invention. It should be noted that the present invention may employ any number of conventional techniques for processing steps such as database storing and retrieving, displaying text and graphics, printing output, sending files, and the like. Such general techniques that may be known to those skilled in the art are not described in detail herein.

It should be appreciated that the particular implementations and processes shown and described herein are illustrative of the present invention and its best mode and are not intended to otherwise limit the scope of the present invention in any way. Indeed, for the sake of brevity, conventional software programming and encryption techniques may not be described in detail herein.

Figure 1:
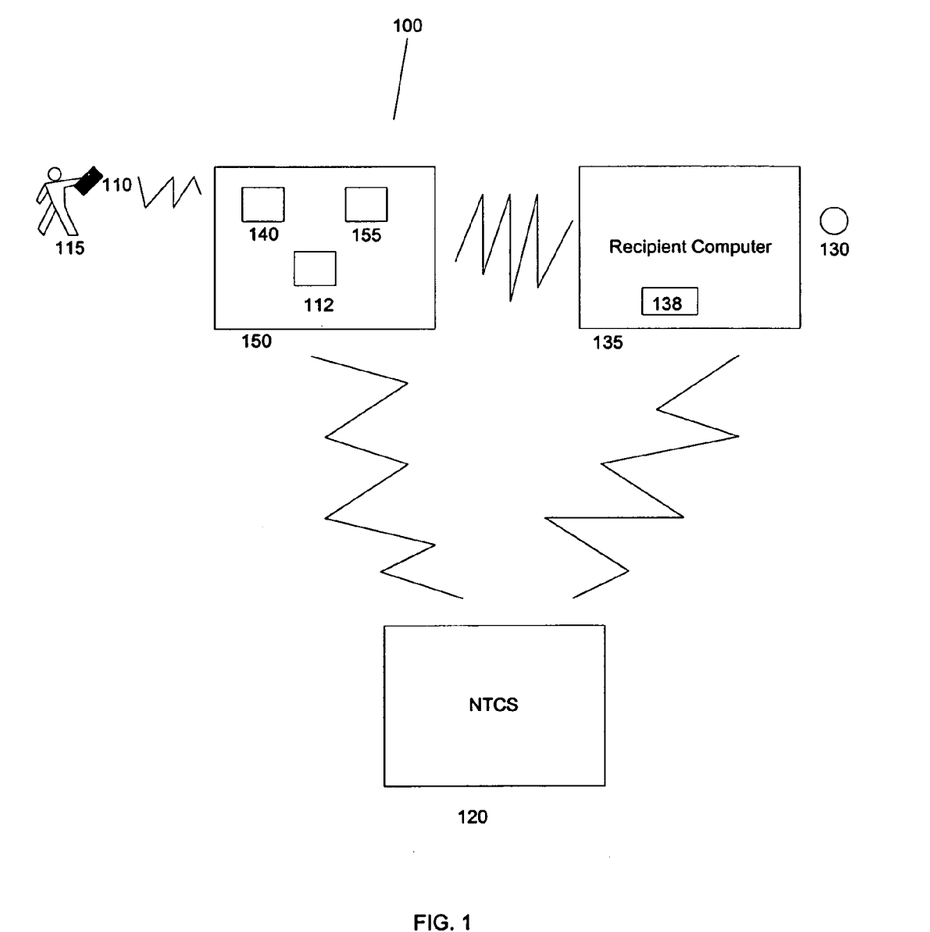
FIG. 1 is a block diagram representing an exemplary system for performing the methods of the present invention.

As previously discussed, there is a need for a new method and system which will enable the secure digital signatures of documents. Referring now to FIG. 1, a system 100 for enabling digital signatures of documents comprises one or more personal handheld or portable devices 110 also referred to as tokens, and a third party 120, also referred to as a Notarial Transaction Certification Server (NTCS). Users 115 of the tokens may use the tokens to digitally sign documents which may be transmitted to a recipient 130 who has a computer 135 or similar device for receiving computer documents.

The document to be signed may be referred to as the Original File 140 and may be stored on a computerized device, such as a personal computer 150, a personal digital assistant (PDA) or the like. User 115 may use token 110, which may be embodied by an acoustic token, such as the device disclosed in U.S. Pat. No. 6,236,724, (hereinafter the '724 patent) issued on May 22, 2001, to Encotone Ltd of Jerusalem, Israel, and herein incorporated by reference. Alternatively, user 115 may utilize a cellular phone with special software which will enable it to act in a similar manner to token 110 and which will be described in more detail below. Such a device may be embodied by such a device as disclosed in PCT patent application number PCT/IB/01989 and herein incorporated by reference or by any other handheld or portable device such as a PDA or token with acoustic capabilities, wherein all such devices may be referred to collectively as token 110.

Computer 150 may further comprise a Decoder 155 that may be embodied as a software or hardware module to perform decoding functions as further described in detail below.

Figure 2:
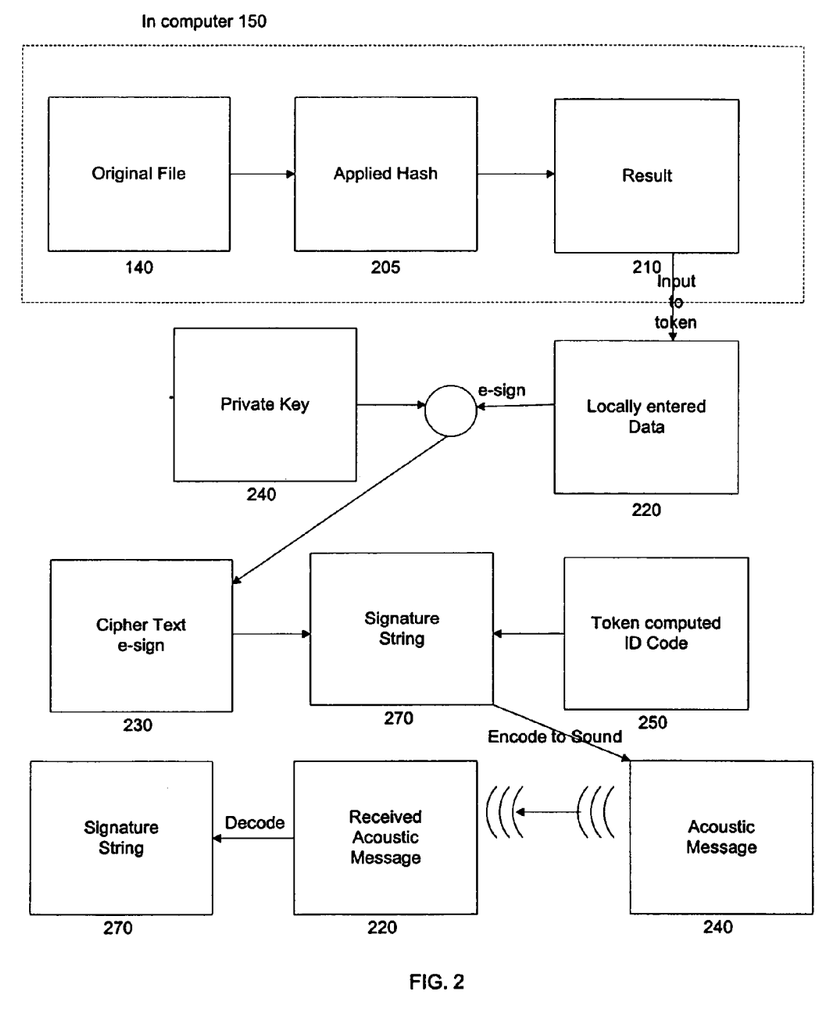
FIG. 2 is a block flow diagram that illustrates the flow of data for forming and decoding an exemplary digital signature for a document in accordance with an exemplary embodiment of the present invention.

With reference to FIGS. 1 and 2, in accordance with one aspect of the present invention, token holder or user 115 utilizes computer 150 to apply a specific Hash function 205 (e.g., SHA1, MD5 or any other suitable hash function) to Original File 140. The application of hash function 205 to original file 140 produces a result 210. Next, user 115 may enter result 210 into token 110 by means of the token's keypad, by infrared communication, by scanning in a bar code, or by any other suitable means for entering data into token 110. The entered data may be referred to as locally entered data 220 and in some cases, may be Hash result 210. Token 110 may digitally sign the locally entered data 220 to produce cipher text or e-sign 230 which may include the Locally entered data 220 in a open way, not encrypted, on top of the encrypted or signed version. The encryption of locally entered data 220 by token 110 may be performed by applying a hash function to locally entered data 220 and then signing the hashed data by using digital signature standards such as the Elliptic Curve Digital Signature Algorithm (ECDSA), or other suitable asymmetrical algorithm, that utilizes a token specific private key 240.

Next, token 110 computes a token identification code (ID Code) 250. In accordance with one aspect of the present invention, the token ID Code may be a variable or dynamic code. Token 110 may encode ID Code 250 and cipher text 230, either separately or concatenated together, into sound waves or any other type of analog waves to form acoustic message 260.

Acoustic message 260 may be transmitted from token 110 to computer 150 by utilizing standard computer equipment such as a computer microphone and a sound card. Computer 150 may optionally store acoustic message 260. Decoder 155 of computer 150 may decode acoustic message 260 to form signature string 270. Signature string 270 may comprise a string of digits that correspond to token ID Code 250 and to cipher text 230. It will be appreciated that signature string 270 may be embodied as a computer file or the equivalent. As described above, cipher text 230 includes locally entered data 220 which corresponds to result 210 of applying hash function 205 to original file 140.

In accordance with one embodiment of the present invention, original file 140 and signature string 270 may be transmitted to recipient's computer 135 by Internet, e-mail, modem, Intra-net, computer diskettes, CD-ROM or the like. It will be appreciated that recipient 130 will have received two files—original file 140 and signature string 270. In accordance with one aspect of the present, recipient 130 may check the identity of the digital signer of original file 140, as well as the integrity of original file 140 in the following manner.

Figure 3:
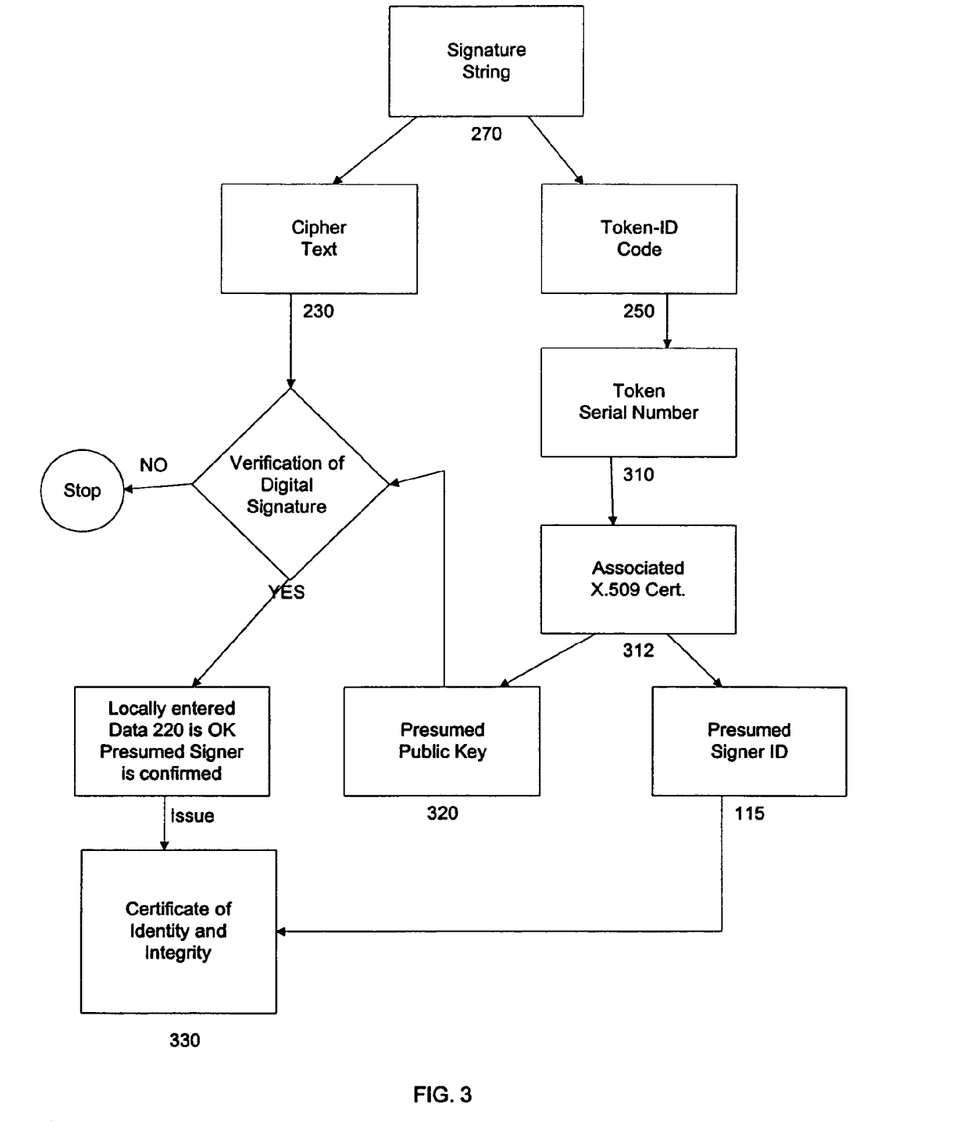
FIG. 3 is a block flow diagram that illustrates the flow of data for forming an exemplary certificate of identity and integrity for the identity of a digital signer of the exemplary digital signature of FIG. 2 in accordance with an exemplary embodiment of the present invention.

With reference to FIGS. 1 and 3, recipient 130 may transmit signature string 270 to a third party referred to as Notarial Transaction Certification Server (NTCS) 120. NTCS 120 may comprise a computer server on the Internet or any other computer or similar device that may be in communication with recipient computer 135. In addition, NTCS 120 is able to access X.509 repositories or the equivalent and retrieve X.509 certificates or the equivalent.

NTCS 120 interprets signature string 270 to determine the token's ID code 250 and cipher text 230. As explained above, the NTCS may use the token ID Code 250 to determine the token serial number 310 that uniquely identifies the token that digitally signed the original file 140 as described below. The retrieval of the X.509 certificate may be made through the interpretation of ID code 250 to uniquely identify a token 110. The retrieved X.509 certificate corresponds to token 110 that created the digital signature.

Since the token's ID code 250 has been interpreted by NTCS 120, the specific token identity has been determined and hence, the corresponding X.509 can be retrieved from the X.509 certificate repository. The X.509 certificates or equivalent can be used to extract the pertinent public key and the identification data of the owner of the public key 320. The NTCS 120 may determine the specific cryptographic key 320 (i.e., the Public Key included in an X.509 certificate that is associated with user or sending entity 115). Public key 320 may be used to decrypt and verify the received cipher text 230 as will be described in detail next.

The verification of the signature string may be made by the use of the corresponding digital signature algorithm that was used to form the signature string (e.g., ECDSA), acting over locally entered data 220, the signed version of the locally entered data, and the public key 320 extracted from the X.509.

Eventually, if the verification of cipher text 230 is successful, using the specific token owner 115 identity, NTCS 120 may prepare a Certificate of Integrity and Identity 330 that may be in the form of a computer document in accordance with known standards such as PKCS #7. Certificate 330 may comprise the identity of the token's owner and the verified locally entered data 220, which in this embodiment is result 210 of applying hash function 205 to original file 140. It will be appreciated that document 330 is a certificate, which ensures the integrity of the original file and the identification of the signer of the original file 140.

In accordance with another embodiment of the present invention, user 115 may transmit signature string 270 directly to NTCS 120 and user 115 may receive certificate 330 from NTCS 120. User 115 may then transmit original file 140 and certificate 330 to recipient 130.

Figure 4:
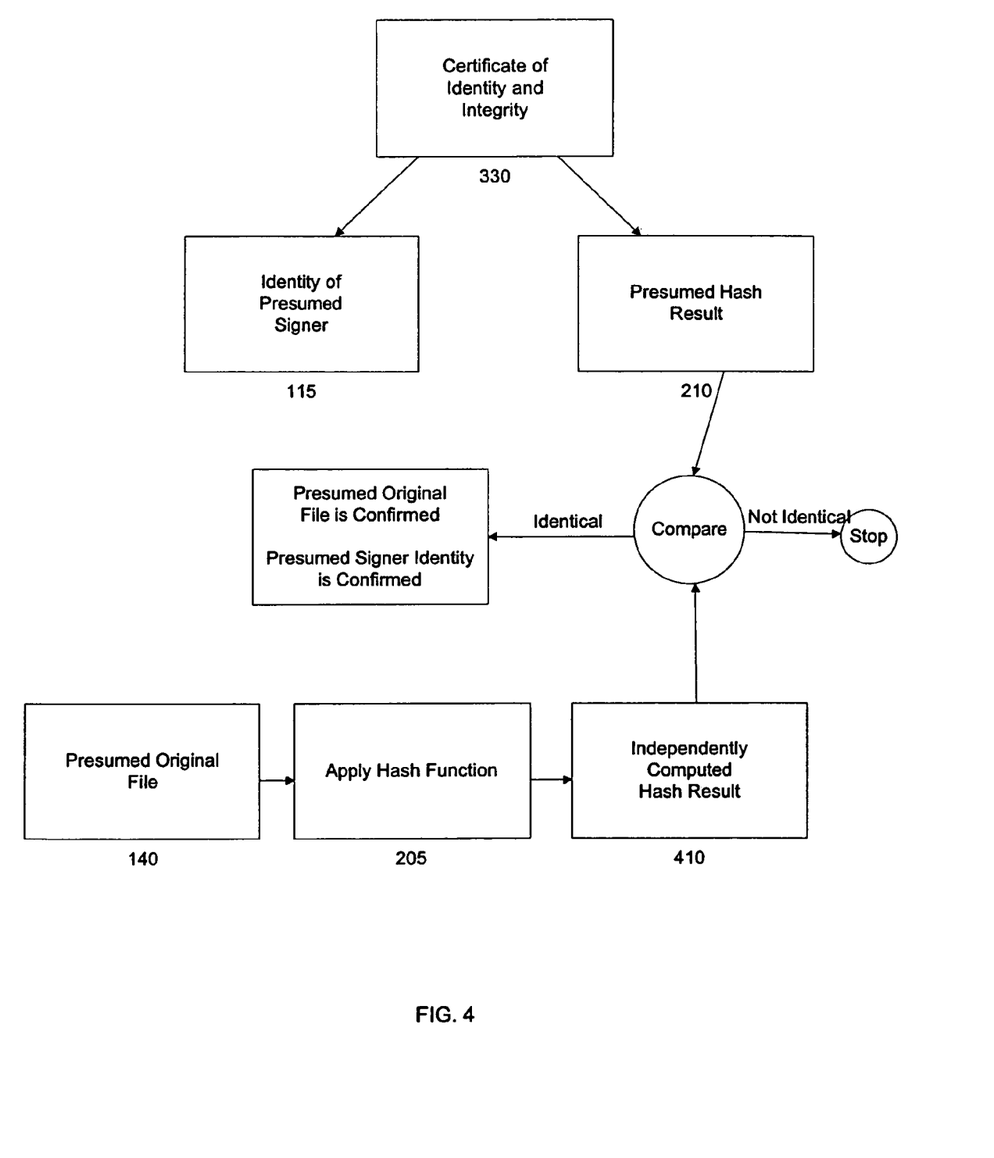
FIG. 4 is a block flow diagram that illustrates the flow of data for using the exemplary certificate of FIG. 3 to check and verify the identity of the digital signer in accordance with an exemplary embodiment of the present invention.

With reference to FIGS. 1 and 4, certificate 330, also referred to as Notarial Transaction Certificate 330, may be sent to recipient 130 in order to verify the integrity and identification of the signer of original file 140. Recipient 130 can use computer 135 to apply the same hash function 205 to the presumed original file that was sent by user 115 to produce "independently computed hash result" 410. Recipient 130 can also retrieve original hash result 210 from certificate 330 so that the original hash result 210 can be compared to the independently computer hash result 410. If hash results 210 and 410 are identical, then it may be concluded that the presumed original file received from token-holder 115 is the correct original file 140 and has not been altered. Furthermore, recipient 130 now has the Certificate of Integrity and Identity 330 that is signed (e.g., using PKCS #7) by NTCS 120 wherein certificate 330 includes the token holder's ID and states that the token holder digitally signed the file that corresponds to the hash result that is included in certificate 330.

It will be appreciated that if NTCS 120 is working within a Certification Authority (CA), then a totally user-friendly method for receiving a digitally signed file has been achieved, without the burden of asking the recipient to check the possible revocation of such certificate 330 that may be associated with the digitally signed file.

In accordance with another aspect of the present invention, a time stamp may be included that represents the time at which token holder 115 digitally signed original file 140. The time stamp may be in the form of the Greenwich mean time (GMT) and date. The time stamp may be concatenated to token's ID code 250 and transmitted in acoustic message 260. Consequently, the recovered signature string 270 may also include the time stamp which can be verified by NTCS 120. Consequently, NTCS 120 may include the time stamp in the Certificate of Integrity and Identity 330 which represents the time at which the token holder 115 signed the original file 140.

Referring back to FIGS. 1 and 2, in accordance with another aspect of the present invention, a signature computation application 112, in the form of a software or hardware module, that may be stored in computer 150, may be used by token holder 115 to compute the signature for original file 140. Signature computation application 112 may be used to compute hash function result 210 of hash function 205 as applied to original file 140. Signature computation application 112 may also be used to transmit hash result 210 to NTCS 120 via the Internet, preferably through a secure channel or an SSL communication link, or a standard or wireless computer or telephone connection. In addition, signature computation application 112 may transmit hash function result 210 to token 110 by any suitable method such as infrared communication, a bar code reader, optical reader, or, alternatively, by displaying result 210 or a part of result 210 using computer's 150 monitor such that token-holder 115 can key result 210 into token 110 by means of the token's keypad. As noted above, the entered data is referred to as locally entered data 220.

In accordance with another aspect of the present invention, a part of hash result 210 may be used instead of the complete result. For example, eight consecutive digits of hash result 210 may be used or alternatively, any other strong function of hash result 210 such as parsing the result into any number of parts and xoring the parts (i.e., performing an XOR operation on the parts) to produce a new result that may be utilized by the token as locally entered data 220. With continued reference to FIG. 2, token 110 now encrypts locally entered data 220 thereby e-signing the locally entered data as described above and producing cipher text 230. Token 110 also computes the token's identification code 250 which may be concatenated with cipher text 230 (i.e., the signature string 270) and encoded into acoustic message 260.

Acoustic message 260 is transmitted by token 110 to computer 150 which receives the acoustic message by means of suitable equipment such as a microphone, a sound card, and the like. Signature computation application 112 may also include decoder 155 and thereby records acoustic message 260 and decodes the message into digital digits thereby recuperating token ID code 250 and cipher text 230. As described above, a new file referred to as signature string 270 may be created which includes token ID code 250 and cipher text 230. In accordance with this embodiment of the present invention, signature computation application 112 sends signature string 270 to NTCS 120 preferably through a secure channel or an SSL communication link.

Next, with reference to FIG. 3, NTCS 120 interprets the token ID code 250 received within signature string 270 thereby determining the token identity (i.e., the token serial number 310). In accordance with another aspect of the present invention, NTCS may use a X.509 repository. After the interpretation of the token ID code to produce the token serial number 310, NTCS 120 may retrieve the corresponding X.509 certificate thereby produce the token holder identity and the public key 320. Using public key 320, NTCS 120 may verify the digital signature on the locally entered data 220. If successful, the veracity of the locally entered data as well as the identity of signer 115 may be confirmed.

For the specific case where the locally entered data 220 contains a partial result (e.g., a function of the result 210), NTCS 120 compares and matches the partial result with all of the results that have been received from NTCS 120 during a pre established window of time, and when a successful match is made, then the relevant result 210 for this transaction has been determined.

In all cases, with reference to FIG. 3, once the corresponding result 210 and the token owner's 115 identity is established, NTCS 120 can prepare a certificate of integrity and identity 330, which may be in the form of a PKCS #7 document, and which includes the identity of the token's owner 115 as well as the original file's hash function result 210, all signed by the NTCS 120, which may be a CA. Certificate 330 may now be transmitted to computer 150 of token holder 115. Signature computation application 112 receives certificate 330 and opens the certificate and verifies the NTCS signature (path, revocation list) proceeding according to the standards for digital signature verification, and, if valid, extracts from the certificate of integrity and identity, the hash result 210. Next, signature computation application 112 computes, independently, the hash function result of original file 140 referred to as independent result 410. Result 410 is now compared to result 210 extracted from the certificate of integrity and identity 330. If results 410 and 210 are identical, signature computation application 112 may announce to token holder 115 that a valid certificate 330 corresponding to original file 140 has been received. Otherwise, token holder 115 may destroy the received certificate of integrity and identity 330.

The token holder 115 can now store both documents—that is original file 140 and certificate of integrity and identity 330 as a record keeping procedure for future usage, or, alternatively, can transfer both documents using any media (e-mail, CD-ROM) to one or more recipients 130.

Now recipient 130 receives the two files 140 and 330 wherein we will momentarily refer to the received original file 140 as the presumed original file due to the fact that the original file may have been replaced or modified by an unscrupulous hacker.

At any time, recipient 130 may check the integrity and identity of the author of the presumed original file. Initially, recipient 130 may open the received PKCS#7 certificate of integrity and identity 330 and verify the NTCS signature (path, revocation list) using standard tools such as Microsoft Outlook Express or other suitable tool. If the certificate of integrity and identity was digitally signed by the NTCS, recipient 130 may extract from such certificate the hash result 210. Next, recipient can independently compute the hash function result of the presumed original file to produce hash result 410. Hash results 210 and 410 are compared, and if the results are identical, the recipient will have verified the integrity of the presumed original file. The verification of the presumed original file will imply that the presumed original file is identical to original file 140 referred to in the certificate of integrity and identity 330 and consequently, the author or signer of such document is the one appearing in the certificate of integrity and identity.

Furthermore, recipient 130 now has possession of the certificate of integrity and identity 330 that is signed in accordance with PKCS #7 by NTCS 120, and includes the ID of the token holder 115 implying that token holder digitally signed the document corresponding to hash function result 210 and, therefore the received document matches the original file 140.

In accordance with another aspect of the present invention, a method as disclosed above is presented wherein NTCS 120 is run by a Certification Authority (CA) which is an entity trusted by the community and legally recognized as a trustee for the issuance of digital certificates.

In accordance with further aspects of the present invention, tokens 110 are used such as the devices disclosed in U.S. Pat. No. 5,524,072 herein incorporated by reference. In addition, the token ID computation may use the methods disclosed in PCT application number PCT/IB98/01834, herein incorporated by reference.

In addition, with reference to FIG. 1, many of the above described implementations can be complemented by providing recipient 130 with a software or hardware module 138 which can execute in the recipient's computer 135. Module 138, referred to as the signature verification application, executes the steps of verifying and opening the certificate of integrity and identity 330. and thereby recovering the hash function result 210. In addition, application 138 applies the hash function 205 onto the received and presumed original file and compares the independently computed result 410 with the result 210 received within the certificate of integrity and identity 330 as described above.

Figure 5:
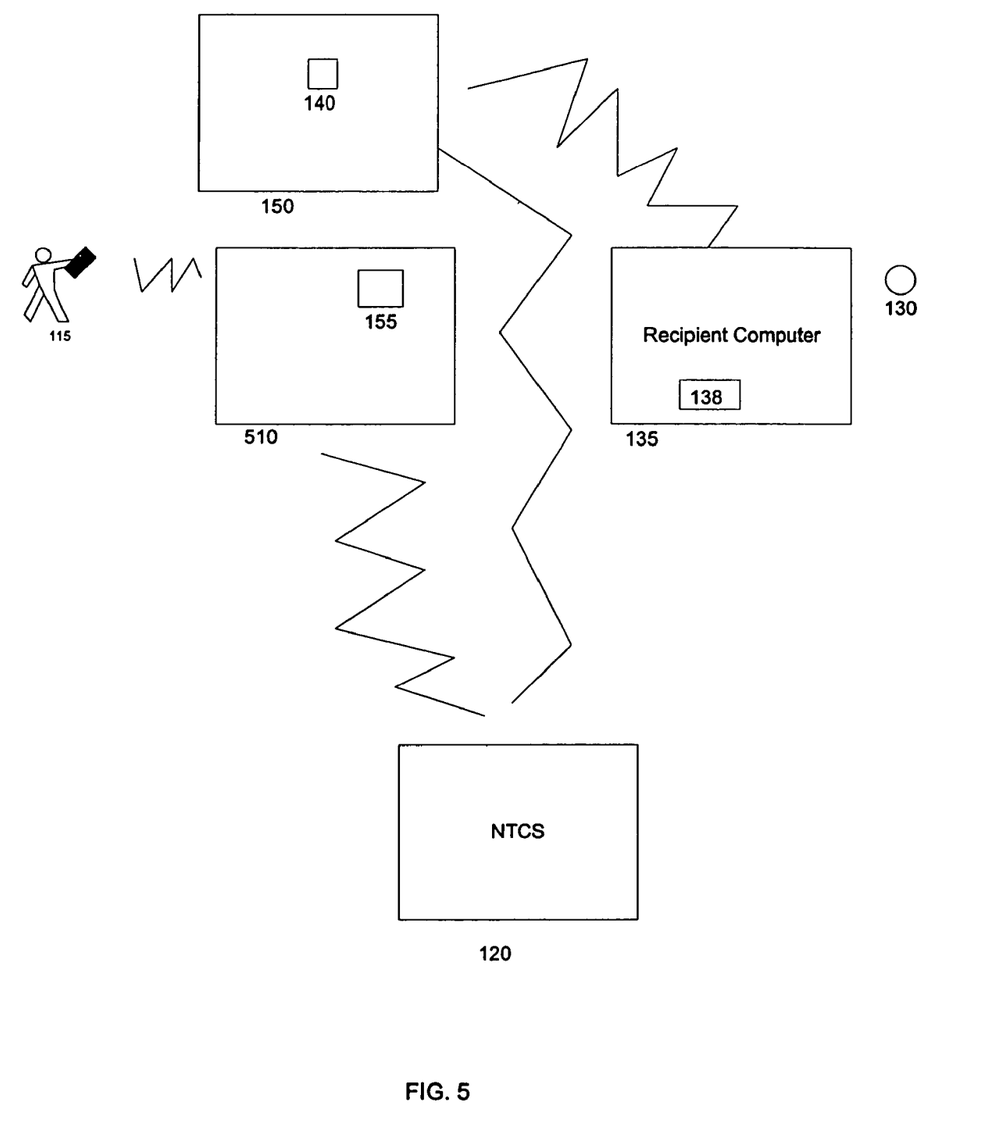
FIG. 5 is a block diagram that illustrates an exemplary embodiment of the present invention.

With reference to FIG. 5, in accordance with a further aspect of the present invention, is a system that includes the features already disclosed and further includes a phone gate server 510. As already disclosed, token holder 115 enters or keys in the full or partial hash function result into token 110. Next, token holder 115 places a call, utilizing any standard or wireless telephone, to phone gate server 510 which comprises a computer server that may be connected by a standard or wireless telephone connection to the Internet or a suitable local area network (LAN). Next, by placing token 110 proximate to the telephone microphone, acoustic message 260 may be transmitted to phone gate server 510. Decoder software 155 may be executed on the phone gate server 510 such that decoder 155 will decode acoustic message 260, and thereby recuperate the token ID Code 250, the time stamp, if present, and cipher text 230, and thereby create the signature string 270 as previously described.

Next, phone gate server 510 may send signature string 270 to NTCS 120, which has previously received result 210 from the signature computation application 112. As a result, NTCS 120 can compute the certificate of integrity and identity 330 as previously disclosed and send it to the token holder PC 150, and the process may continue as previously described.

For example, phone gate server 510 may send signature string 270 to NTCS 120 thereby enabling the NTCS to compute the certificate of integrity and identity 330. However, NTCS 120 may now send to the token holder's computer 150 the certificate of integrity and identity 330. Next, token holder 115 may send original file 140 and certificate 330 to recipient 130. Whenever recipient 130 desires to check and verify the presumed original file, recipient 130 may apply hash function 205 to the received original file and thereby obtain independently computed result 410.

Next, recipient 130 can verify the received certificate of integrity and identity and read hash function result 210. Recipient 130 may compare the independently computed result 410 to hash result 210 for identity, as explained above.

A possible variation of the method is as above but before sending the certificate of integrity and identity, NTCS 120 may send only hash result 210 through a secure channel such as a secure socket link (SSL) or other suitable secure channel. Signature computation application 112 executing on computer 150 may re-check or verify the validity of the digital signature operation by re-computing the hash result of the original file and comparing the result with the original hash result 210 that was received. If there is a match, then application 112 may signal NTCS 120 to send certificate 330.

As a variation of the method previously described, token holder 115 can send the original file to the Recipient 130. Recipient can apply hash function 205 to the presumed original file and obtain independently computed hash result 410. Next, recipient 130 can check and verify the presumed original file by contacting or approaching the NTCS 120 and requesting a certificate authored by the sender or token holder 115, providing details such as the independently computed hash result 410 in order for NTCS 120 to be able to track the relevant stored certificate 330. NTCS 120 will send the appropriate certificate of integrity and identity 330 to the recipient 130 and the recipient can proceed with checking the received certificate of integrity and identity 330 as described above.

In accordance with another aspect of the present invention, the methods of the present invention may include compatibility with the previously mentioned PKI standards wherein the token owner's private key 240 is generated in token 110, according to one of the standard asymmetrical algorithms such as the RSA, ECDSA and the like, and the private key 240 is then stored on the token 110. In addition, software for enabling the digital signature of a string such as locally entered data 220 has already been installed onto token 110. In this manner, token holder 115 may enter all or part of hash function result 210 or any other data into token 110. Token 110 may then hash such entered locally entered data 220, and digitally sign it using the private key and thereby computing a digital string referred to as cipher text 230, which may include the locally entered data 220 as open data.

In accordance with one aspect of the present invention, the locally entered data 220 may be digitally signed by hashing such data 220 and then using the private key to sign the hashed data following one of the known standards (e.g., ECDSA), and then concatenating the data 220 in an open way. Next, token 110 may concatenate a token ID code 250 to the cipher text 230 as previously disclosed and encode the result into sound waves and produce acoustic message 260. The data flow is similar to the examples mentioned above, except NTCS 120 may now query an X.509 repository and retrieve the specific X.509 certificate, that has been issued by a recognized certification authority (CA), that corresponds to token owner 115 and thereby extract the relevant public key 320 as well as the signer identity.

With reference to FIG. 3, the signature computation application 112 or the phone gate server may record and decode the acoustic message by means of a specific software module referred to as a decoder 155. NTCS 120 may interpret the received token ID code 250 and determine the token serial number 310 and thereby retrieve the appropriate X.509 certificate of the token owner 115. Using the certificate, the token owner identity and the token public key 320 may be determined.

In accordance with another aspect of the present invention, token 110 may computes a totally dynamic ID code 250 based on a reversible algorithm and wherein NTCS 120 has the key or keys to reverse the algorithm and retrieve the token identification 250. In this manner, an eavesdropper will be unable to easily identify or track the token holder 115.

In accordance with another aspect of the present invention, the ID code 250 may include the GMT time and date stamp, in order to state the time of the transaction and avoid repeated use of the same acoustic message 260.

In accordance with further aspects of the present invention, a solution of the problem of the Card-Not-Present Credit Card transactions is enabled. As it is well known in the art, remote transactions utilizing credit cards fall in the category of Card-Not-Present Credit Card (CC) transactions wherein the credit card holder cannot conventionally sign a document as proof of their acceptance of the transaction (i.e., to charge the credit card holder's credit card account for the transaction).

In accordance with another aspect of the present invention, the credit card holders may send to their credit card issuer, a PKI signed, transaction specific Certificate, by means of token 110, through computer 150 or through a standard or cellular telephone. The credit card issuer may deliver to the credit card holder an acoustic token, or the acoustic token may be in the hands of the Credit card holder due to other reasons (e.g., corporate's network access) wherein the Credit Card Account is limited in its capacity to complete remote transactions or Card-Not-Present Credit Card transactions when there is not a PKI signed transaction Certificate specific for such a transaction, that is digitally signed by the card holder.

When the credit card holder decides to complete an e-commerce, telephone, or internet transaction (e.g., buying a book from an internet or remote merchant), the credit card holder may enter into their token, locally entered data 220 which includes the amount to charge to the credit card.

As explained above, the token may compute a digital signature of the locally entered data 220 which, may be concatenated with the GMT time and date, and thereby create a signature string 270. Signature string 270 may includes an ID-Code (250) which may be the token serial number 310. In addition, the signature string 270 may include the locally entered data 220, the GMT time and Date, the locally entered data, the GMT time and Date, wherein the locally entered data and the GMT time and date may be digitally signed (i.e., encrypted with the token's private key 240 according to the ECDSA). The token will also encode the signature string 270 to sound and thereby produce an acoustic message 260.

In accordance with another embodiment of the present invention, the token holder calls the credit card issuer and sends the acoustic message through the phone (standard or wireless) to the credit card issuer. As explained above, by means of the phone gate server 510, the acoustic message 260 is converted into a signature string 270 and transmitted to a NTCS 120, which, as explained before, verifies the signature. In this case, the NTCS interprets the received token's ID code 250 that is stored within the signature string 270 and thereby determines the token identity (i.e., the token serial number 310). Next, the NTCS 120 can obtain the tokens owner's identity by querying a X.509 repository. Utilizing the token serial number 310, the NTCS can retrieve the corresponding X.509 certificate and extract the token holder identity as well as the Public Key.

Next, the NTCS 120 may verify the digital signature of the locally entered data 220 and the GMT time and date if present. If the verification is successful, NTCS 120 may issue a verification certification (e.g., in accordance with PKCS #7) with the token holder 115 identity and the verified locally entered data 220 which includes the transaction amount. Once the credit card holder completes the credit card transaction procedure (i.e., sends back to the merchant the form), the merchant will request the credit card transaction authorization as usual. It should be appreciated that the present method is totally transparent to the merchant.

When the transaction authorization request arrives at the credit card issuer, the issuer will check if the credit card holder has sent the PKI Signed transaction authorization (i.e., for the exact amount). If the authorization has been received, the credit card issuer will go ahead with the transaction authorization procedure, otherwise, it will stop it.

As a variation of this method for credit card issuers, instead of using the phone to send the acoustic message, the credit card holder may send the same acoustic message 260 to the computer 150 microphone, wherein a software module which includes a decoder 155 will decode the acoustic message 260 into a signature string 270 and send the signature string to the credit card issuer's NTCS 120.

It is hereby suggested that the above presented Credit Card Issuer solution may complement the Visa's 3D Secure methodology, in regard to achieve cardholder's digital signature for the specific transaction authorization.

In accordance to another aspect of the present invention, token 110 generates a signature string 270 and encodes the signature string to sound 260 (i.e., the acoustic message). The acoustic message 260 may be transmitted to computer 150 and decoder 155 may then decode the acoustic message into signature string 270. The signature string 270, or a portion of the signature string that includes ID code 250, may be transmitted to a third party entity 120. The third party entity may then retrieve the corresponding X.509 certificate and send the certificate to computer 150.

In accordance with further aspects of the present invention, instead of using computer 150, the acoustic message 260 may be sent through a conventional or wireless telephone to a telephone gate 510. Telephone gate 510 may then decode the acoustic message into signature string 270 and send the digital string 270, or a portion of digital string 270 that includes ID code 250, to third party entity 120. The third party entity may then retrieve the corresponding X.509 certificate and send the certificate to computer 150.

According to a further implementation, the acoustic token may be a cellular phone, and the token holder enters the locally entered data as in any of the cases above, into the cellular phone instead of into the token. The cellular phone also includes installed software wherein the software enables the storing of at least one private key for signing strings, and the other functions of the token as previously described, including the capability to compute ID codes, digital signatures and to generate as sound the acoustic message 260.

In addition, according to another aspect of the present invention, the cellular holder places a call, by means of the cellular phone, to a specially configured computer server, referred to as a certificate storing server, which is a server which stores for each of the cellular phone's holders, the corresponding X.509 certificate issued to the cellular-holder. In addition, the certificate storing server identifies the cellular phone by means of the caller-ID method or by other suitable means. During the call, the cellular-phone sends as digital data (e.g., SMS) or acoustic data, the signed version of the previously entered locally entered data 220, referred to as cipher text 230, wherein the certificate storing server verifies, keeps, and stores the cipher text. In addition, whenever the recipient 130 would like to check and verify the received presumed original file 140, the recipient contacts the certificate storing server, and sends data in order to enable the certificate storing server to retrieve the relevant cipher text 230 and the corresponding X.509 certificate. Data that can be used to track the corresponding cipher text 230 can be, for example, the independently computed Hash Result 410. Once the retrieving process is completed, the certificate storing server sends to the recipient 130 the cipher text 230 as well as the corresponding X.509 certificate.

In accordance with another aspect of the present invention, the secret key 240 and special software with the functions of the acoustic token may be inserted into the cellular phone by means of the cellular phone SIM card. Alternatively, the special software may be inserted into the CPU of the cellular phone and just the secrets keys (i.e., private key) will be in the SIM Card.

One configuration is to replace the cell phone battery with a special battery containing totally or partially the acoustic token hardware and software components, and also other components, in order to enable-phone holders, any type of present in use phones, to carry only the cellular phone wherein the cellular phone contains the acoustic token capabilities.

In accordance with another aspect of the present invention, the method further comprises a strong authentication method wherein an authentication server is installed in a network to be accessed, in order to authenticate the entities trying to access the network locally or remotely, and wherein the authentication server generates a challenge and sends this challenge to the entity (i.e., a token holder network accessor) which is attempting to access the network, and wherein the token holder digitally signs the challenge by means of the acoustic token entering the challenge as locally entered data 220, and wherein the corresponding signature string 270 is sent back to the authentication server. According to the current method of the present invention, the authentication server by means of the token serial number will know who the accessor pretends to be, and may retrieve the corresponding X.509, and thereby verify the signature of the challenge, and eventually, if confirmed, to check the authorization of the accessor, which is the token owner as it appears in the X.509 certificate.

A variation of this method is, as above, but wherein the methods are applied to physical access to physical areas, like buildings, rooms, restricted areas, and wherein the authentication server sends a challenge, and the accessor by means of the token, responds with a response, which is the challenge digitally signed as above.

An additional variation of this method is, as above, but, instead of signing a challenge, as locally entered data 220, the token holder does not enter any data at all. This time, the token will compute an ID Code 250, and will digitally sign the ID code 250. Now, the method is as above, but instead of the locally entered data 220, there is ID-code 250, which optionally has the time stamp embedded.

Another variation of the device and method of the present invention is a token with keypad and display which has a detachable part with a USB connector, and wherein the token holder as in all the cases above, enters locally entered data 220 in the token while the detachable part with the USB connector is attached. After data 220 is entered, the token holder may detach the detachable part in order to carry the signature string 270 to a USB compatible device (e.g., a PC), instead of using acoustical capabilities to transmit the signature string 270.

Also, the detachable part may be used to carry the locally entered data 220 into the token in the following way: assuming an original file 140 is in PC 150 and the Hash result 210 is computed, i.e.: when the detachable part is connected by means of the USB connectivity means of the PC 150. Now the Complete hash 210 is transmitted or burned into the detachable part. If the detachable part is now detached and attached to the token, the token will proceed as above, when in this case the locally entered data 220 will be the data previously burned into the detachable part.

A further variation of the method of the present invention is an acoustic token as above, which on top of the functions described above computes, at one particular instance, the private key 240 and the corresponding public key 320, and, at one particular instance generates as sound the public key 320, for the purpose of enrollment and generation of the X.509 certificate.

A further configuration is as above but after the enrollment, the token receives, through optical means, or other media, a king of simplified X.509 certificate, mainly with the private key 320 and the owner's ID data, signed by a CA, in a way such, when the token is used for signing locally entered data 220, it will concatenate to the signature string 270, such simplified X.509 certificate issued by a known CA and previously burned into the token.

In this way, the token will encode to sound the signature string 270 and the simplified X.509.

Although the invention has been described herein in conjunction with the explanation and examples mentioned above, those skilled in the art will appreciate that the scope of the invention is not so limited. Various modifications in the selection and arrangement of the various components and method steps discussed herein may be made without departing from the spirit of the invention as set forth in the appended claims.

I claim:

1. A method for verifying a digital signature on a document utilizing a third party node, comprising the steps of:
   digitally signing, by a signer node, the document wherein the digital signature of the document is created;
   extracting, by the signer node, the document from the digital signature;
   calculating a hash value of the document;
   creating a modified digital string by replacing the extracted document with the calculated hash value;
   sending, by the signer node, the modified digital string to the third party node; and
   mathematically verifying, by the third party node, that the modified digital string includes the hash value of the document which has been digitally signed by a signer.

2. The method of claim 1, further comprising the steps of:
   preparing, by the third party node, a new digital string that includes the hash value of the document, and an indication that the verification of the digital signature was successful, wherein the indication includes an identity of the signer;
   signing the new digital string with a third party private key; and
   transmitting the digitally signed new string to the signer node.

3. The method of claim 2, wherein the indication further includes a time of the verification.

4. A method for verification of a digital signature of a document, generated by a signer node, by a recipient of the digital signature, utilizing a third party node, comprising the steps of:

extracting the document, by a recipient node, from a digital string that includes the digital signature;

replacing the extracted document by a hash value of the document, wherein a modified digital string is created;

sending the modified string to the third party node; and mathematically verifying, by the third party node, that the modified digital string contains the hash value of the document which has been digitally signed by a signer.

5. The method of claim 4, further comprising the steps of:

preparing, by the third party node, a new digital string including the hash value of the document, and an indication that the verification of the digital signature was successful, wherein the indication includes an identity of the signer;

signing the new string with a third party private key; and transmitting the digitally signed new string to the recipient node.

6. The method of claim 5, wherein the indication further comprises a time of the verification.

* * * * *